United States Patent
Ling et al.

(10) Patent No.: US 11,243,900 B2
(45) Date of Patent: Feb. 8, 2022

(54) DATA TRANSMISSION METHOD AND DEVICE

(71) Applicant: HUAWEI TECHNOLOGIES CO., LTD., Guangdong (CN)

(72) Inventors: Wenkai Ling, Hangzhou (CN); Jianrong Xu, Hangzhou (CN); Yong Liu, Xi'an (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 8 days.

(21) Appl. No.: 16/670,193

(22) Filed: Oct. 31, 2019

(65) Prior Publication Data
US 2020/0065279 A1 Feb. 27, 2020

Related U.S. Application Data

(63) Continuation of application No. PCT/CN2018/088922, filed on May 30, 2018.

(30) Foreign Application Priority Data

Jul. 27, 2017 (CN) .......................... 201710624681.2

(51) Int. Cl.
*G06F 13/36* (2006.01)
*H04L 12/861* (2013.01)
*H04L 29/06* (2006.01)

(52) U.S. Cl.
CPC .............. *G06F 13/36* (2013.01); *H04L 49/90* (2013.01); *H04L 69/22* (2013.01); *G06F 2213/40* (2013.01)

(58) Field of Classification Search
CPC ..... G06F 13/36; G06F 2213/40; H06L 49/90; H06L 69/22
See application file for complete search history.

(56) References Cited

U.S. PATENT DOCUMENTS 6,067,603 A * 5/2000 Carpenter ........... G06F 12/0813
710/104
6,091,714 A * 7/2000 Sensei ................. H04L 12/1813
370/260
(Continued)

FOREIGN PATENT DOCUMENTS

CN 102026045 A 4/2011
CN 102638589 A 8/2012
(Continued)

OTHER PUBLICATIONS

Extended (Supplementary) European Search Report dated Mar. 25, 2020, issued in counterpart EP Application No. 18837449 0. (7 pages).

(Continued)

*Primary Examiner* — Henry Tsai
*Assistant Examiner* — Aurangzeb Hassan
(74) *Attorney, Agent, or Firm* — Westerman, Hattori, Daniels & Adrian, LLP (57) ABSTRACT

A data transmission method, including obtaining by a transmit end, at least two to-be-transmitted packets, determining a first interface used to transmit each of the packets in at least two interfaces of the transmit end, and determining an identifier of each of the packets that is related to the first interface, where the identifier represents an order of the first interface used to transmit each of the packets in the at least two interfaces used to send the at least two packets adding the identifier to a packet header of each of the packets and sending a packet added with the identifier to the receive end device through the first interface, so that the receive end device adjusts, based on the identifier, an order of the packet added with the identifier.

11 Claims, 5 Drawing Sheets

(56) References Cited

U.S. PATENT DOCUMENTS

| | | | |
|---|---|---|---|
| 6,714,559 B1* | 3/2004 | Meier | H01Q 1/007 370/449 |
| 6,751,698 B1* | 6/2004 | Deneroff | G06F 15/17343 710/317 |
| 7,383,423 B1* | 6/2008 | Hughes | G06F 15/8007 712/28 |
| 7,613,885 B2* | 11/2009 | Uehara | G06F 12/0831 711/146 |
| 8,792,388 B2* | 7/2014 | Yamato | H04L 45/66 370/255 |
| 2003/0118035 A1 | 6/2003 | Sharma et al. | |
| 2005/0034049 A1* | 2/2005 | Nemawarkar | H04L 67/12 714/758 |
| 2007/0242604 A1* | 10/2007 | Takase | H04J 3/14 370/223 |
| 2008/0244134 A1* | 10/2008 | Hosomi | G06F 12/0808 710/200 |
| 2009/0213868 A1 | 8/2009 | Budhia et al. | |
| 2011/0138099 A1* | 6/2011 | Kawahara | G06F 15/173 710/317 |
| 2013/0073814 A1* | 3/2013 | Wang | G06F 15/173 711/148 |
| 2014/0204740 A1* | 7/2014 | Tokutsu | H04L 47/2441 370/230 |
| 2015/0095008 A1 | 4/2015 | Wang et al. | |
| 2015/0156129 A1* | 6/2015 | Tsuruoka | H04L 47/323 370/235 |
| 2016/0147620 A1* | 5/2016 | Lesartre | G06F 11/1666 714/6.3 |
| 2016/0196087 A1* | 7/2016 | Wang | G06F 12/0817 711/154 |
| 2016/0234091 A1* | 8/2016 | Emmadi | H04L 41/0806 |
| 2016/0283429 A1 | 9/2016 | Wagh et al. | |
| 2017/0134535 A1* | 5/2017 | Osamura | H04L 69/16 |
| 2017/0155458 A1 | 6/2017 | He et al. | |
| 2017/0315916 A1* | 11/2017 | Cheng | G06F 12/0822 |
| 2018/0191826 A1* | 7/2018 | Das | G06F 3/0635 |
| 2019/0012279 A1* | 1/2019 | Takizawa | G06F 13/4059 |

FOREIGN PATENT DOCUMENTS

| | | |
|---|---|---|
| CN | 103092807 A | 5/2013 |
| CN | 103150264 A | 6/2013 |
| CN | 105281883 A | 1/2016 |
| CN | 105808499 A | 7/2016 |
| CN | 106230744 A | 12/2016 |
| JP | 3822508 B2 | 9/2006 |
| KR | 20050022759 A | 3/2005 |

OTHER PUBLICATIONS

Office Action dated Dec. 11, 2019, issued in counterpart CN Application No. 201710624681.2, with English Translation. (27 pages).

International Search Report dated Sep. 7, 2018, issued in counterpart Application No. PCT/CN2018/088922, with English translation. (10 pages).

Caixia Liu et al.: "HHMA: A Hierarchical Hybrid Memory Architecture Sharing Multi-Port Memory", Young Computer Scientists, 2008. ICYCS 2008. The 9th International Conference For, IEEE, Piscataway, NJ, USA, Nov. 18, 2008 (Nov. 18, 2008), pp. 1320-1325, XP031373361, ISBN 978-0-7695-3398-8.

Office Action dated Nov. 23, 2020, issued in counterpart EP Application No. 18 837 449.0. (10 pages).

* cited by examiner

DATA TRANSMISSION METHOD AND DEVICE

CROSS-REFERENCE TO RELATED APPLICATIONS

This application is a continuation of International Application No. PCT/CN2018/088922, filed on May 30, 2018, which claims priority to Chinese Patent Application No. 201710624681.2, filed on Jul. 27, 2017. The disclosures of the aforementioned applications are hereby incorporated by reference in their entireties.

TECHNICAL FIELD

The embodiments of the present invention relate to the communications field, and more specifically, to a data transmission method and device in the communications field.

BACKGROUND

With the progress of technologies, a higher requirement is raised on processor performance. To meet this requirement, a processor system with a stronger processing capability is developed, for example, a symmetric multi-processor (SMP) system, a cluster (Cluster) system, a massively parallel processing (MPP) system, a non-uniform memory access (NUMA) system, or another processor system architecture. These architectures improve system performance mainly through memory and bus sharing. For example, in the NUMA system architecture, nodes connect to each other and exchange information in an interconnection mode. In one operating system, all CPUs and memories of the entire system may be shared, thereby improving and optimizing performance of the processor system.

A node controller (NC) is a chip used for central processing unit (CPU) extension, and can implement interconnection between a plurality of CPUs. The node controller is connected to the CPUs by using 20 lanes (lane), and is also connected to another NC through a port. However, at present, a physical (PHY) interface between an NC and a CPU supports only positive sequence connection and reverse sequence connection, and one-to-one connection of optical ports (CXP) on a port needs to be supported between NCs. As a result, connection between an NC and a CPU and connection between NCs have low flexibility.

SUMMARY

The embodiments of the present invention provide a data transmission method, so that data can be transmitted between a CPU and an NC that have disordered cabling or between NCs with CXPs inserted in a mixed manner.

According to a first aspect, an embodiment of the present invention provides a data transmission method. The method is applied to a processor system, and the processor system includes a first node controller NC, and further includes a CPU connected to the first NC or a second NC connected to the first NC; and the method is executed by a transmit end, the transmit end is the first NC, the CPU, or the second NC, the transmit end has at least two interfaces, and each interface at the transmit end is connected to an interface at a receive end. The method includes:

obtaining, by the transmit end, at least two to-be-transmitted packets;

determining, by the transmit end in the at least two interfaces of the transmit end, a first interface used to transmit each of the packets, and determining an identifier that is of each of the packets and that is related to the first interface, where the identifier represents an order of the first interface used to transmit each of the packets in the at least two interfaces used to send the at least two packets; and herein, the order of the first interface used to transmit each of the packets in the at least two interfaces used to send the at least two packets may be a positive order or a reverse order;

adding, by the transmit end, the identifier to each of the packets;

sending, by the transmit end to the receive end through the first interface, a packet added with the identifier;

obtaining, by the receive end, the identifier in the packet; and sending, by the receive end, the packet to a processing queue of an interface having the identifier at the receive end.

In this embodiment of the present invention, when sending the at least two packets, the transmit end adds an identifier related to an interface at the transmit end to each packet, and then sends a packet added with the identifier between a CPU and an NC that have disordered physical cabling or between NCs with CXPs inserted in a mixed manner, so that the receive end can adjust a sequence of at least two received packets based on the identifier included in the packets. In this way, data can be transmitted between the CPU and the NC that have disordered physical cabling or between the NCs with CXPs inserted in the mixed manner.

In this embodiment of the present invention, interfaces between the CPU and the NC or between the NCs may be connected in a disordered manner. To be specific, the CPU and the NC may not be connected in a positive sequence or a reverse sequence, so that a PHY interface on the CPU is connected to any PHY interface on the NC to form a lane. In addition, CXP interfaces between the NCs may not be connected in a manner with sequence numbers corresponding to each other one to one. To be specific, the CXP interfaces may be inserted in a mixed manner, so that a CXP interface on a port of an NC is connected to any CXP interface on a corresponding port of another NC through an optical cable or a cable. In this embodiment of the present invention, physical cabling between the CPU and the NC is more flexible, and connection of the CXP interfaces between the NCs is also more flexible.

Optionally, in this embodiment of the present invention, when data is transmitted between the CPU and the NC in a full bandwidth transmission manner, a quantity of the at least two interfaces of the transmit end is equal to a quantity of the at least two packets, and the identifier that is of each of the packets and that is related to the first interface is an identifier of the first interface. Alternatively, when data is transmitted between the CPU and the NC in a half bandwidth transmission manner, the identifier that is of each of the packets and that is related to the first interface is an identifier of the first interface.

As an example, an identifier of each packet is a sequence number of a PHY interface used for transmitting the packet.

In this embodiment of the present invention, quantities of PHY interfaces on the CPU and the NC each may be 20. A quantity of CXP interfaces on each port of the NC may be 3. Accordingly, 20 lanes for data transmission may be formed between the CPU and the NC. Three optical cables or cables may be inserted in the mixed manner between NCs to transmit data.

When the transmit end determines to transmit packets by using all the interfaces, the transmit end may transmit each corresponding packet by separately using a PHY interface or a CXP interface that has a same sequence number as the packet. For example, the transmit end may sequentially transmit packet 0, packet 1, . . . , and packet 19 by using PHY 0 to PHY 19, or sequentially transmit packet 0, packet 1, and packet 2 by using CXP 0 to CXP 2.

Optionally, in this embodiment of the present invention, when data is transmitted between the CPU and the NC in a half bandwidth transmission manner, if a quantity of the packets is n and an order of a first interface used to transmit an $i^{th}$ packet in the n packets in n interfaces used to transmit the n packets is i, an identifier that is of the $i^{th}$ packet and that is related to the first interface is an identifier of an $i^{th}$ interface at the transmit end, where a quantity of the at least two interfaces of the transmit end is greater than or equal to a quantity of the at least two packets, n is a positive integer, and i is a positive integer less than or equal to n.

As an example, when data is transmitted in a half bandwidth transmission manner, any eight lanes may be selected from the 20 lanes, for example, eight lanes corresponding to PHY 10 to PHY 17 of the transmit end may be selected, or eight lanes corresponding to PHY 0, PHY 3, PHY 4, PHY 8, PHY 11, PHY 15, PHY 16, and PHY 17 of the transmit end may be selected. In this case, eight packets may be allocated to interfaces corresponding to the eight lanes for transmission. In this case, it may be determined that identifiers of the packets transmitted on PHY 10 to PHY 17 are 0 to 7 in sequence, or identifiers of the packets transmitted on PHY 0, PHY 3, PHY 4, PHY 8, PHY 11, PHY 15, PHY 16, and PHY 17 are 0 to 7 in sequence.

In this way, provided that there are at least eight available lanes between the CPU and the NC, data may be transmitted by using the eight lanes. That is, in this embodiment of the present invention, data may be transmitted in the half bandwidth transmission manner when a plurality of PHY interfaces fail.

Optionally, in this embodiment of the present invention, when data is transmitted between the NCs through a CXP interface, the first NC may determine that an identifier that is of each packet and that is related to an interface at the transmit end is a sequence number of a CXP interface used for transmitting the packet.

Optionally, when a packet is sent between the NCs through a CXP interface, if a second interface on a first port of the first NC fails, the transmit end sends, to the receive end through a third interface on the first port, a packet added with an identifier related to the second interface. In this way, when a CXP interface fails, another CXP interface may be used for transmission, and the receive end can parse out the packet normally.

According to a second aspect of the embodiments of the present invention, a node controller NC for data transmission is provided. The NC has a function of implementing NC behavior in the first aspect or the possible implementations of the first aspect. The function may be implemented by hardware, or may be implemented by hardware by executing corresponding software. The hardware or software includes one or more modules corresponding to the foregoing function.

According to a third aspect of the embodiments of the present invention, a node controller NC for data transmission is provided. The NC includes a memory, a processor, and a communications interface, where the memory is configured to store program code, and the processor is configured to support the NC in executing a corresponding function in the foregoing method and is also configured to execute the program code stored in the memory. The communications interface is configured to support communication between the NC and another NC or between the NC and a CPU.

According to a fourth aspect of the embodiments of the present invention, a computer-readable medium is provided. The computer-readable medium stores program code, and the program code includes an instruction used to execute behavior of the node controller NC in the first aspect or the possible implementations of the first aspect.

According to a fifth aspect of the embodiments of the present invention, a CPU for data transmission is provided. The CPU has a function of implementing CPU behavior in the first aspect or the possible implementations of the first aspect. The function may be implemented by hardware, or may be implemented by hardware by executing corresponding software. The hardware or software includes one or more modules corresponding to the foregoing function.

According to a sixth aspect of the embodiments of the present invention, a CPU for data transmission is provided. The CPU includes a memory, a processor, and a communications interface, where the memory is configured to store program code, and the processor is configured to support the CPU in executing a corresponding function in the foregoing method and is also configured to execute the program code stored in the memory. The communications interface is configured to support communication between the CPU and an NC.

According to a seventh aspect of the embodiments of the present invention, a computer-readable medium is provided. The computer-readable medium stores program code, and the program code includes an instruction used to execute behavior of the CPU in the first aspect or the possible implementations of the first aspect.

DESCRIPTION OF EMBODIMENTS

The following describes the embodiments of the present invention with reference to the accompanying drawings.

Figure 1:
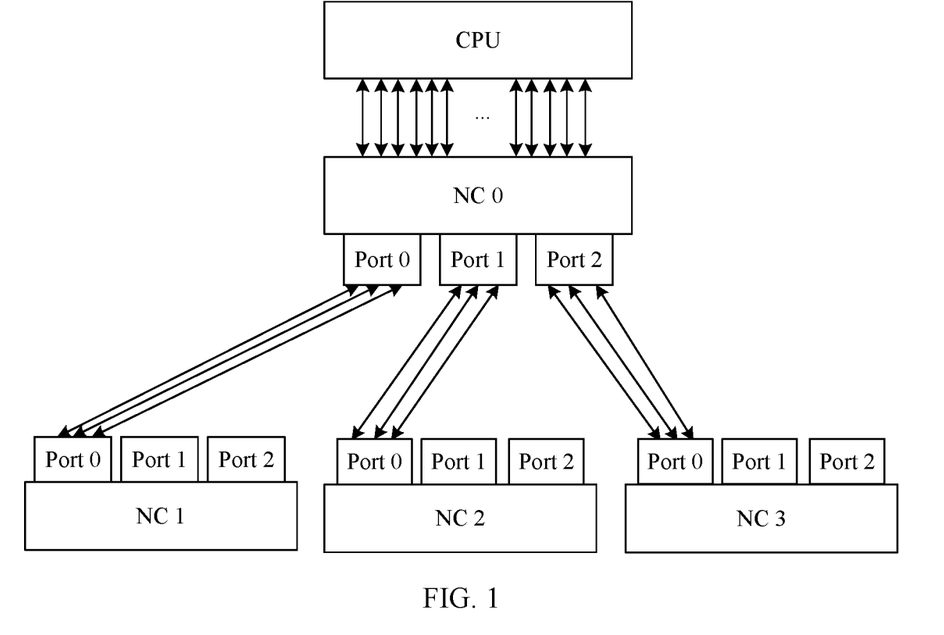
FIG. 1 is a schematic diagram of a connection manner between a CPU and an NC according to an embodiment of the present invention.

FIG. 1 is a schematic diagram of a connection manner between a CPU and an NC according to an embodiment of the present invention. In FIG. 1, NC 0 can be connected to one CPU and a plurality of NCs. Specifically, NC 0 is connected to the CPU by using 20 lanes, and is also connected to NC 1, NC 2, and NC 3 through port 0, port 1, and port 2 on NC 0 respectively.

Specifically, two ends of each lane between NC 0 and the CPU are a PHY interface of the CPU and a PHY interface of the NC. Herein, the PHY interface of the CPU and the PHY interface of the NC each have a sequence number, and a sequence number can indicate an order of a PHY interface in all PHY interfaces. In the related art, a PHY interface of the CPU and a PHY interface of the NC may be connected to form a lane through cabling in a positive or reverse sequence, and the lane may be used to transmit data between the CPU and the NC.

During cabling in a positive sequence, PHY interfaces on the CPU are connected to PHY interfaces with same sequence numbers on the NC. For example, PHY 0 on the CPU is connected to PHY 0 on the NC, PHY 1 on the CPU is connected to PHY 1 on the NC, and PHY 19 on the CPU is connected to PHY 19 on the NC. In this way, 20 lanes may be formed.

During cabling in a reverse sequence, a PHY interface with a minimum sequence number on the CPU is sequentially connected to a PHY interface with a maximum sequence number on the NC, or a PHY interface with a maximum sequence number on the CPU is sequentially connected to a PHY interface with a minimum sequence number on the NC. For example, PHY 0 on the CPU is connected to PHY 19 on the NC, and PHY 1 on the CPU is connected to PHY 18 on the NC. Based on a similar cabling manner, 20 lanes may be formed.

In this embodiment of the present invention, the transmit end is the CPU and the receive end is the NC, or the transmit end is the NC and the receive end is the CPU. Specifically, when the CPU sends a packet to the NC, the CPU may be referred to as the transmit end, and the NC may be referred to as the receive end. When the NC sends a packet to the CPU, the NC may be referred to as the transmit end, and the CPU may be referred to as the receive end.

Herein, data may be transmitted between the CPU and the NC in a full bandwidth transmission manner or a half bandwidth transmission manner. When data is transmitted in the half bandwidth transmission manner in a system in which the CPU and the NC have positive-sequence physical cabling, the data may be transmitted by using eight lanes between PHY 0 to PHY 7 of the transmit end and PHY 0 to PHY 7 of the receive end, or the data may be transmitted by using eight lanes between PHY 12 to PHY 19 of the transmit end and PHY 12 to PHY 19 of the receive end. When data is transmitted in the half bandwidth transmission manner in a system in which the CPU and the NC have physical cabling in a reverse sequence manner, the data may be transmitted by using eight lanes between PHY 0 to PHY 7 of the transmit end and PHY 12 to PHY 19 of the receive end, or the data may be transmitted by using eight lanes between PHY 12 to PHY 19 of the transmit end and PHY 0 to PHY 7 of the receive end. When data is transmitted in the half bandwidth transmission manner, if one interface in PHY 0 to PHY 7 fails and one interface in PHY 12 to PHY 19 fails, data cannot be transmitted between the CPU and the NC.

In this embodiment of the present invention, when data is transmitted between NCs through a CXP interface, the transmit end may be referred to as a first NC, and the receive end may be referred to as a second NC. A first port of the first NC has at least two interfaces, and an interface connected to an interface on the first port is located on a second port of the second NC.

For example, in FIG. 1, NC 0 is connected to NC 1, NC 2, and NC 3 through port 0, port 1, the and port 2 respectively. There are three CXPs on each port on an NC. The CXPs on each port has a sequence number, and the CXPs on each port are numbered independently. The sequence number can indicate an order of a CXP interface in all PHY interfaces on one port.

In the related art, when the three CXPs on one port of the first NC are connected to the three CXPs on a corresponding port of the second NC, sequence numbers of the CXPs need to be in one-to-one correspondences. For example, the three CXPs on port 0 of NC 0 may be CXP 0, CXP 1, and CXP 2, and the three CXPs on port 0 of NC 1 may be CXP 0, CXP 1, and CXP 2. In addition, CXP 0 on port 0 of NC 0 is connected to CXP 0 on port 0 of NC 1 through an optical cable or a cable, CXP 1 on port 0 of NC 0 is connected to CXP 1 on port 0 of NC 1 through an optical cable or a cable, and CXP 2 on port 0 of NC 0 is connected to CXP 2 on port 0 of NC 1 through an optical cable or a cable. It may be understood that NC 0 may be connected to NC 2 and NC 3 in a manner similar to the manner in which NC 0 is connected to NC 1. Herein, a cable or an optical cable between CXPs may also be referred to as a lane.

It can be learned that, in the related art, PHY interfaces between a CPU and an NC need to be connected through cabling in a positive or reverse sequence, and CXP interfaces between NCs also need to be connected in one-to-one correspondences. In other words, in the related art, the interfaces between the CPU and the NC or between the NCs need to be connected in a fixed connection manner, and flexibility is low. In addition, the CXP interfaces between the NCs need to be connected manually, and when the CXP interfaces are connected incorrectly, a packet cannot be identified, and it is difficult to locate a fault.

In this embodiment of the present invention, the interfaces between the CPU and the NC or between the NCs may be connected in a disordered manner. To be specific, the CPU and the NC may not be connected in a positive sequence or a reverse sequence, so that a PHY interface on the CPU is connected to any PHY interface on the NC to form a lane. In addition, the CXP interfaces between the NCs may not be connected in a manner with sequence numbers corresponding to each other one to one. To be specific, the CXP interfaces may be inserted in a mixed manner, so that a CXP interface on a port of an NC is connected to any CXP interface on a corresponding port of another NC through an optical cable or a cable. In this embodiment of the present invention, physical cabling between the CPU and the NC is more flexible, and connection of the CXP interfaces between the NCs is also more flexible.

For example, the 20 lanes between the CPU and NC 0 in FIG. 1 may be randomly connected. Specifically, any PHY interface on the CPU may be connected to any PHY interface on NC 0. In this way, cabling between the CPU and the NC is more flexible. In addition, in FIG. 1, any CXP interface on port 0 of NC 0 may be connected to any CXP interface on port 0 of NC 1 by using an optical cable or a cable, any CXP interface on port 1 of NC 0 may be connected to any CXP interface on port 0 of NC 2, and any CXP interface on port 2 of NC 0 may be connected to any CXP interface on port 0 of NC 3. In this way, the CXP interfaces between the NCs are connected in a more flexible manner.

Figure 2:
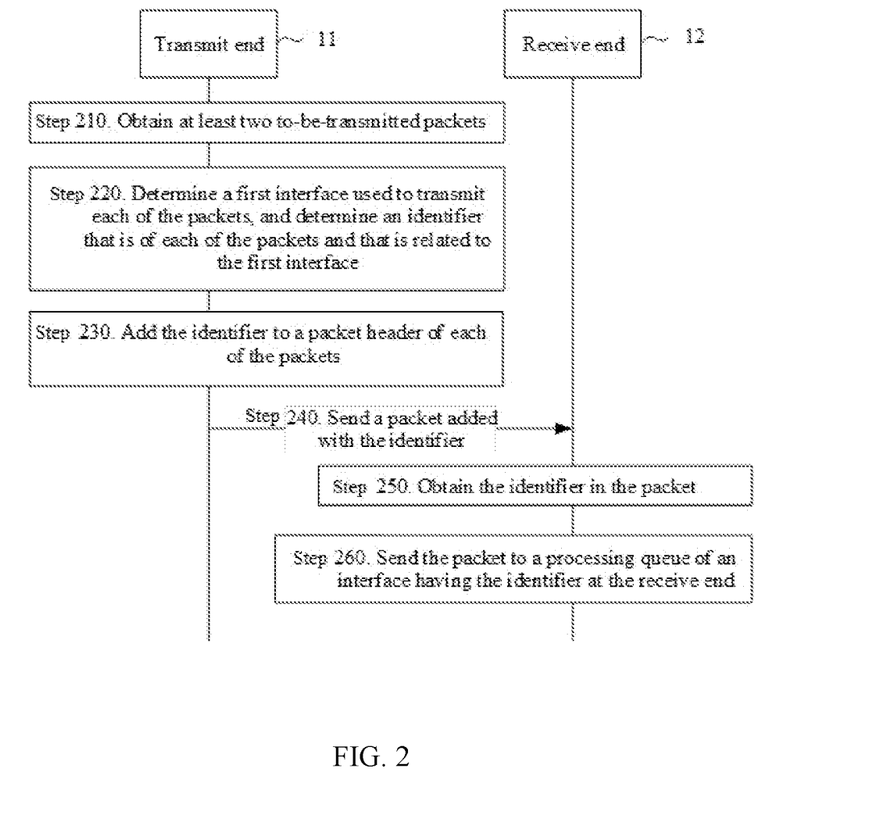
FIG. 2 is a schematic flowchart of a data transmission method according to an embodiment of the present invention.

FIG. 2 is a schematic flowchart of a data transmission method according to an embodiment of the present invention. In the method, a transmit end 11 is the CPU in the foregoing description, a receive end 12 is the NC in the foregoing description, or the transmit end 11 is the NC in the foregoing description, and the receive end 12 is the CPU in the foregoing description. Alternatively, the transmit end 11 is the first NC, and the receive end 12 is the second NC.

In step 210, the transmit end 11 obtains at least two to-be-transmitted packets.

When the transmit end needs to send data to the receive end, the transmit end may divide the to-be-transmitted data into a plurality of data packets, and encapsulate the data packets into a plurality of packets for transmission.

Specifically, when data is transmitted between the CPU and the NC in a full bandwidth transmission manner, the transmit end may obtain 20 packets. When data is transmitted between the CPU and the NC in a half bandwidth transmission manner, the transmit end may obtain eight packets. When data is transmitted between NCs, the transmit end may obtain three packets.

In step 220, the transmit end 11 determines, in at least two interfaces of the transmit end 11, a first interface used to transmit each of the packets, and determines an identifier that is of each of the packets and that is related to the first interface. The identifier represents an order of the first interface used to transmit each of the packets in the at least two interfaces used to send the at least two packets. Herein, the order of the first interface used to transmit each of the packets in the at least two interfaces used to send the at least two packets may be a positive order or a reverse order.

In other words, the transmit end may determine a packet to be transmitted on each lane, and determine an identifier related to the first interface for the packet.

Specifically, in this embodiment of the present invention, when data is transmitted between the CPU and the NC in the full bandwidth transmission manner, the transmit end may determine to allocate 20 packets to 20 PHY interfaces of the transmit end, and then each PHY interface sends a packet in a sending queue of the PHY interface through a lane of the PHY interface. When data is transmitted between the CPU and the NC in the half bandwidth transmission manner, the transmit end may determine to allocate eight packets to eight PHY interfaces of the transmit end, and then each PHY interface sends a packet in a sending queue of the PHY interface through a lane. When data is transmitted between the NCs, the transmit end may determine to allocate three packets to three CXP interfaces of the transmit end, and then each CXP interface sends a packet in a sending queue of the CXP interface through an optical cable or a cable.

As an example, the transmit end may sort a plurality of packets. For example, after sorting, the transmit end may obtain 20 packets, which are successively packet 0, packet 1, . . . , and packet 19, or obtain eight packets, which are successively packet 0, packet 1, . . . , and packet 7, or obtain three packets, which are successively packet 0, packet 1, and packet 2.

When the transmit end determines to transmit packets by using all the interfaces, the transmit end may transmit each corresponding packet by separately using a PHY interface or a CXP interface that has a same sequence number as the packet. For example, the transmit end may sequentially transmit packet 0, packet 1, . . . , and packet 19 by using PHY 0 to PHY 19, or sequentially transmit packet 0, packet 1, and packet 2 by using CXP 0 to CXP 2.

When data is transmitted between the CPU and the NC in the half bandwidth transmission manner, the transmit end may sequentially allocate eight packets to eight PHY interfaces based on sequence numbers of the PHY interfaces in ascending order (or in descending order). For example, when the transmit end selects PHY 10 to PHY 17 to transmit the packets, packet 0, packet 1, and packet 7 may be sequentially allocated to PHY 10 to PHY 17 for transmission. When the transmit end selects PHY 0, PHY 3, PHY 4, PHY 8, PHY 11, PHY 15, PHY 16, and PHY 17 to transmit the packets, packet 0, packet 1, and packet 7 may be sequentially allocated to PHY 0, PHY 3, PHY 4, PHY 8, PHY 11, PHY 15, PHY 16, and PHY 17 for transmission.

After the transmit end allocates, to the packets, the interfaces used to transmit the packets, the transmit end determines, for each packet, an identifier related to an interface used to transmit the packet. The identifier represents an order of the first interface used to transmit each of the packets in the at least two interfaces used to send the at least two packets.

Optionally, in this embodiment of the present invention, when data is transmitted between the CPU and the NC in the full bandwidth transmission manner, a quantity of the at least two interfaces of the transmit end is equal to a quantity of the at least two packets, and the identifier that is of each of the packets and that is related to the first interface is an identifier of the first interface. Alternatively, when data is transmitted between the CPU and the NC in the half bandwidth transmission manner, the identifier that is of each of the packets and that is related to the first interface is an identifier of the first interface.

As an example, an identifier of each packet is a sequence number of a PHY interface used for transmitting the packet. For example, when the transmit end determines to send a packet by using PHY 1, an identifier of the packet is a sequence number 1 of PHY 1. When the transmit end determines to send a packet by using PHY 4, an identifier of the packet is a sequence number 4 of PHY 4.

Optionally, in this embodiment of the present invention, when data is transmitted between the CPU and the NC in the half bandwidth transmission manner, if a quantity of the packets is n and an order of a first interface used to transmit an $i^{th}$ packet in the n packets in n interfaces used to transmit the n packets is i, an identifier that is of the $i^{th}$ packet and that is related to the first interface is an identifier of an $i^{th}$ interface at the transmit end, where a quantity of the at least two interfaces of the transmit end is greater than or equal to a quantity of the at least two packets, n is a positive integer, and i is a positive integer less than or equal to n.

As an example, when data is transmitted in the half bandwidth transmission manner, any eight lanes may be selected from the 20 lanes, for example, eight lanes corresponding to PHY 10 to PHY 17 of the transmit end may be selected, or eight lanes corresponding to PHY 0, PHY 3, PHY 4, PHY 8, PHY 11, PHY 15, PHY 16, and PHY 17 of the transmit end may be selected. In this case, eight packets may be allocated to interfaces corresponding to the eight lanes for transmission. In this case, it may be determined that identifiers of the packets transmitted on PHY 10 to PHY 17 are 0 to 7 in sequence, or identifiers of the packets transmitted on PHY 0, PHY 3, PHY 4, PHY 8, PHY 11, PHY 15, PHY 16, and PHY 17 are 0 to 7 in sequence. In this way, provided that there are at least eight available lanes between the CPU and the NC, data may be transmitted by using the eight lanes. That is, in this embodiment of the present invention, data may be transmitted in the half bandwidth transmission manner when a plurality of PHY interfaces fail.

Optionally, in this embodiment of the present invention, when data is transmitted between the NCs through a CXP interface, the first NC may determine that an identifier that is of each packet and that is related to an interface at the transmit end is a sequence number of a CXP interface used for transmitting the packet. For example, when the transmit end determines to send a packet by using CXP 1, an identifier of the packet may be 1. When the transmit end sends a packet by using CXP 2, an identifier of the packet may be 2.

In step 230, the transmit end 11 adds the identifier to each of the packets.

Specifically, the transmit end may encapsulate the identifier of each packet into a packet header of the packet.

In step 240, the transmit end 11 sends the packet obtained in step 230 to the receive end 12 through the first interface, so that the receive end 12 adjusts, based on the identifier, an order of the packet added with the identifier.

Optionally, when a packet is sent between the NCs through a CXP interface, if a second interface on a first port of the first NC fails, the transmit end sends, to the receive end through a third interface on the first port, a packet added with an identifier related to the second interface. For example, when CXP 1 on port 0 of NC 0 fails, a packet allocated to CXP 1 may be transmitted through CXP 0 or CXP 2 on port 0. In this way, when a CXP interface fails, another CXP interface may be used for transmission, and the receive end can parse out the packet normally.

After the transmit end sends the packet to the receive end, the receive end receives the packet through the second interface. The second interface is one of the at least two interfaces of the receive end, and the second interface is disorderly connected to the first interface at the transmit end.

In step 250, the receive end 12 obtains the identifier in the packet.

Specifically, the receive end may obtain the identifier from a corresponding field in the packet header of the packet.

In step 260, the receive end 12 sends the packet to a processing queue of an interface having the identifier at the receive end 12. Specifically, after the receive end obtains an identifier that is of the packet and that is related to an interface at the transmit end, the receive end may send a second packet to the processing queue of the interface with the identifier at the receive end. In this way, in a subsequent processing queue, a packet sequence is adjusted.

For example, when data is transmitted between the CPU and the NC and an identifier in a packet received by PHY 1 of the receive end is 0, the receive end sends the packet to a processing queue of a PHY interface whose identifier is 0 in the receive end, to be specific, sends the packet to a processing queue of PHY 0. When data is transmitted between the NCs and an identifier in a packet received by CXP 0 of the receive end is 2, the receive end sends the packet to a processing queue of a CXP interface whose identifier is 2 in the receive end, to be specific, sends the packet to a processing queue of CXP 2. In this way, in a subsequent processing queue, a packet sequence is the same as a sequence in which the transmit end sends the packet.

Therefore, in this embodiment of the present invention, when sending the at least two packets, the transmit end adds an identifier related to an interface at the transmit end to each packet, and then sends a packet added with the identifier between a CPU and an NC that have disordered physical cabling or between NCs with CXPs inserted in a mixed manner, so that the receive end can adjust a sequence of at least two received packets based on the identifier included in the packets. In this way, data can be transmitted between the CPU and the NC that have disordered physical cabling or between the NCs with CXPs inserted in the mixed manner.

Figure 3:
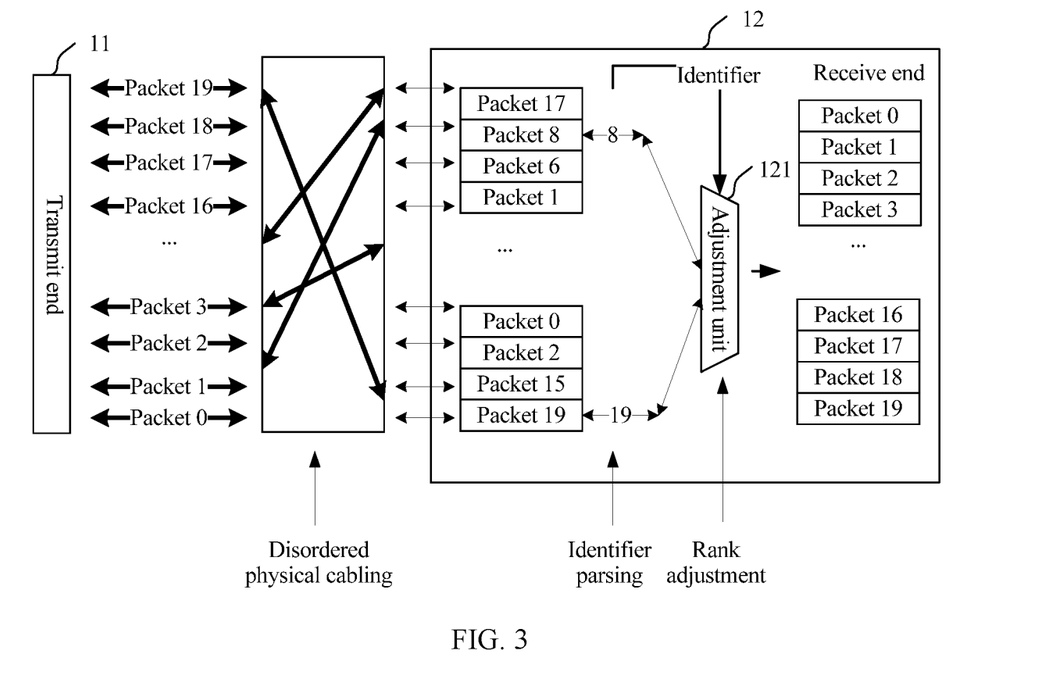
FIG. 3 is a schematic diagram of a data transmission method between a CPU and an NC in a full bandwidth transmission manner according to an embodiment of the present invention.

FIG. 3 is a schematic diagram of a data transmission method between a CPU and an NC in a full bandwidth manner according to an embodiment of the present invention. Reference numerals that are shown below and that are the same as those in FIG. 2 represent same or similar modules or units. Herein, a transmit end 11 may allocate packets 0 to 19 to PHY 19 to PHY 0. In this case, identifiers that are of the packets 0 to 19 and that are related to the interfaces of the transmit end are 19 to 0 respectively. Because physical cabling between the CPU and the NC is disordered, packets received by PHY interfaces of a receive end 12 are disordered. For example, packets corresponding to PHY 0 to PHY 19 are successively packet 17, packet 8, packet 6, packet 1, packet 0, packet 2, packet 15, and packet 19. After receiving the packets, the receive end 12 parses the identifier in each packet. For example, the receive end may successively learn through parsing that identifiers of PHY 0 to PHY 19 are 17, 8, 6, 1, . . . , 0, 2, 15 and 19. Then, the receive end 12 inputs the identifiers obtained through parsing into an adjustment unit 121, and the adjustment unit 121 transmits, based on the identifier of each packet, the packet to a processing queue with a corresponding identifier at the receive end. Specifically, the receive end transmits packet 17 with the identifier of 17 to a processing queue corresponding to PHY 17 in the receive end, and transmits packet 8 with the identifier of 8 to a processing queue corresponding to PHY 8 in the receive end. Similarly, the receive end transmits packet 6, packet 1, . . . , packet 0, packet 2, packet 15 and packet 19 to processing queues corresponding to corresponding PHY interfaces in the receive end.

Figure 4:
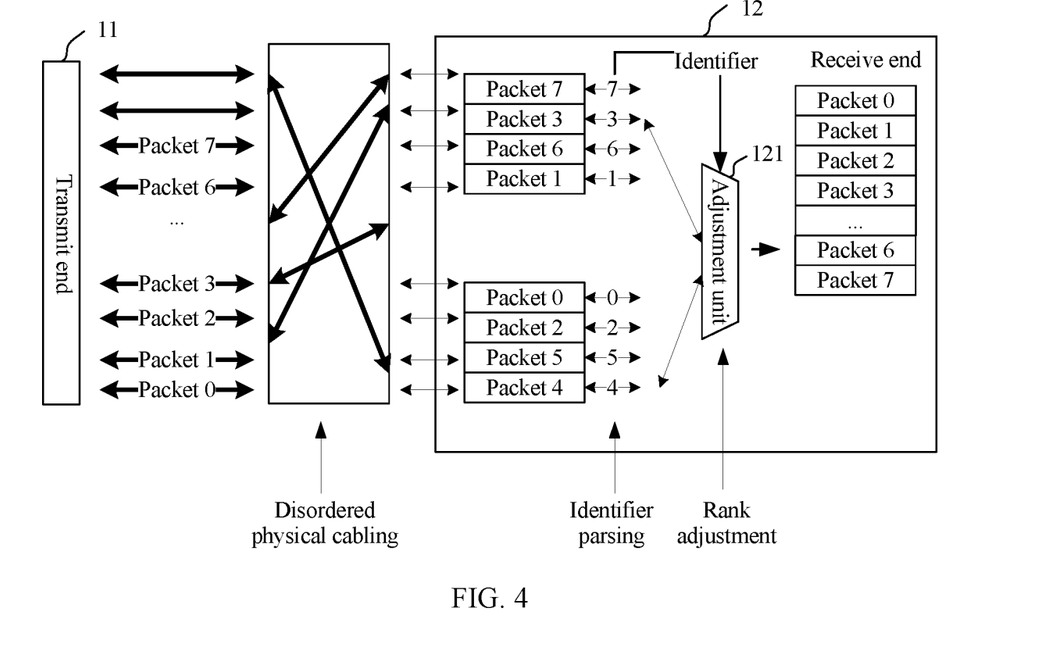
FIG. 4 is a schematic diagram of a data transmission method between a CPU and an NC in a half bandwidth transmission manner according to an embodiment of the present invention.

FIG. 4 is a schematic diagram of a data transmission method between a CPU and an NC in a half bandwidth transmission manner according to an embodiment of the present invention. When a PHY interface in a transmit end 11 or a receive end 12 fails, data may be transmitted in the half bandwidth transmission manner. In this case, eight packets may be allocated to any eight PHY interfaces that can work normally in the transmit end 11, and an identifier of a packet to be transmitted on each PHY interface is successively determined based on orders of sequence numbers of the PHY interfaces. For example, when it is determined to transmit packets on PHY 10 to PHY 17, identifiers of packets transmitted on PHY 10 to PHY 17 are successively 0 to 7. In this case, the receive end 12 parses the identifiers of the eight packets, and inputs the identifiers obtained by parsing into an adjustment unit 121, and the adjustment unit 121 transmits, based on the identifier of each packet, the packet to a processing queue with a corresponding identifier at the receive end. Similarly, the receive end transmits the received packets with identifiers of 7, 3, 6, 1, 2, 5, and 4 to processing queues corresponding to PHY interfaces in the receive end.

Figure 5:
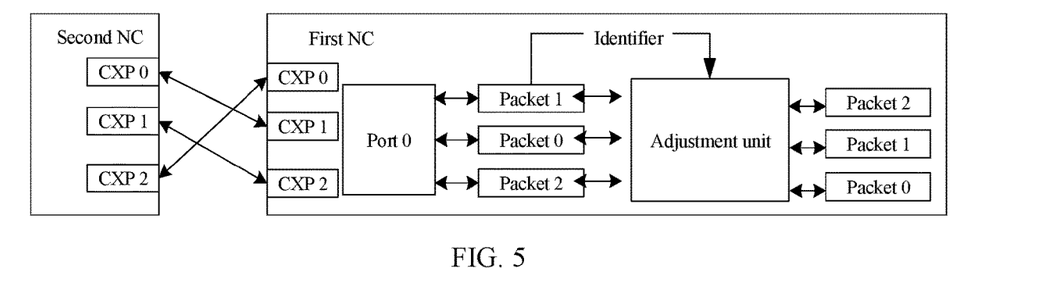
FIG. 5 is a schematic diagram of a data transmission method between NCs according to an embodiment of the present invention.

FIG. 5 is a schematic diagram of a data transmission method between NCs according to an embodiment of the present invention. A receive end shown in FIG. 5 is a first NC, and the first NC is connected to a transmit end (a second NC) through port 0. Specifically, CXP 0, CXP 1, and CXP 2 of the second NC are connected to CXP 1, CXP 2, and CXP 0 of the first NC in a mixed manner. In this case, when the second NC transmits packet 0, packet 1, and packet 2 to the first NC through CXP 0, CXP 1, and the CXP 2 respectively, identifiers 0, 1, and 2 are added to packet headers of packet 0, packet 1, and packet 2 respectively. In this case, packet 1, packet 0, and packet 2 are received by CXP 0, CXP 1, and CXP 2 of the receive end (namely, the first NC) respectively, and the receive end parses out the identifier of each packet. The receive end inputs the identifiers obtained through parsing into an adjustment unit. The adjustment unit transmits, based on the identifier of each packet, the packets to processing queues with corresponding identifiers in the first NC. Similarly, the first NC transmits the packets with identifiers 1, 0, and 2 to processing queues of CXP 1, CXP 2, and CXP 0 in the first NC respectively.

In addition, in the receive end shown in FIG. 5, when one lane or a CXP interface corresponding to one lane fails in the receive end or the transmit end, another lane on a same port may be used to transmit a packet allocated to the lane. For example, when a lane between CXP 1 of the second NC and CXP 2 of the receive end fails, packet 0 and packet 2 that are added with identifiers may be transmitted on a lane between CXP 2 of the transmit end and CXP 0 of the receive end, and the identifier of each packet is parsed out. The transmit end inputs the identifiers obtained by parsing into the adjustment unit. The adjustment unit transmits, based on the identifier of each packet, the packets to processing queues with corresponding identifiers in the first NC. Similarly, the first NC transmits the packets with identifiers 1, 0, and 2 to processing queues of CXP 1, CXP 2, and CXP 0 in the first NC respectively.

Therefore, in this embodiment of the present invention, when sending the at least two packets, the transmit end adds an identifier related to an interface at the transmit end to each packet, and then sends a packet added with the identifier between a CPU and an NC that have disordered physical cabling or between NCs with CXPs inserted in a mixed manner, so that the receive end adjusts a sequence of at least two received packets based on the identifier included in the packets. In this way, data can be transmitted between the CPU and the NC that have disordered physical cabling or between the NCs with CXPs inserted in the mixed manner.

Figure 6:
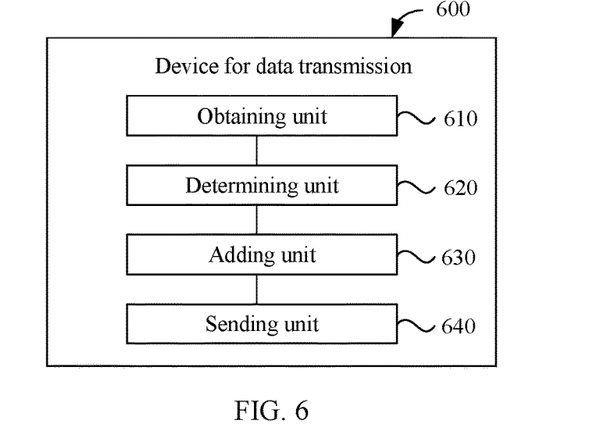
FIG. 6 is a schematic block diagram of a data transmission device according to an embodiment of the present invention.

FIG. 6 is a schematic block diagram of a device 600 for data transmission according to an embodiment of the present invention. The device 600 is a device in a processor system, and the processor system includes a first node controller NC, and further includes a CPU connected to the first NC or a second NC connected to the first NC, where the device 600 is a transmit end device, the transmit end device is the first NC, the CPU, or the second NC, the transmit end device has at least two interfaces, and each interface of the transmit end device is connected to an interface of a receive end device. The device 600 includes an obtaining unit 610, a determining unit 620, an adding unit 630, and a sending unit 640.

The obtaining unit 610 is configured to obtain at least two to-be-transmitted packets.

The determining unit 620 is configured to: determine, in the at least two interfaces of the transmit end device, a first interface used to transmit each of the packets, and determine an identifier that is of each of the packets and that is related to the first interface, where the identifier represents an order of the first interface used to transmit each of the packets in the at least two interfaces used to send the at least two packets.

The adding unit 630 is configured to add the identifier to a packet header of each of the packets.

The sending unit 640 is configured to send, to the receive end through the first interface, a packet added with the identifier, so that the receive end device adjusts, based on the identifier, an order of the packet added with the identifier.

In this embodiment of the present invention, when sending the at least two packets, the transmit end adds an identifier related to an interface at the transmit end to each packet, and then sends a packet added with the identifier between a CPU and an NC that have disordered physical cabling or between NCs with CXPs inserted in a mixed manner, so that the receive end adjusts a sequence of at least two received packets based on the identifier included in the packets. In this way, data can be transmitted between the CPU and the NC that have disordered physical cabling or between the NCs with CXPs inserted in the mixed manner.

Optionally, if the processor system includes the first NC and the CPU, when data is transmitted between the CPU and the first NC in a full bandwidth transmission manner, a quantity of the at least two interfaces of the transmit end device is equal to a quantity of the at least two packets, and the identifier that is of each of the packets and that is related to the first interface is an identifier used for the first interface.

Optionally, if the processor system includes the first NC and the CPU, when data is transmitted between the CPU and the first NC in a half bandwidth transmission manner, if a quantity of the packets is n and an order of a first interface used to transmit an $i^{th}$ packet in the n packets in n interfaces used to transmit the n packets is i, an identifier that is of the $i^{th}$ packet and that is related to the first interface is an identifier of an $i^{th}$ interface at the transmit end, where a quantity of the at least two interfaces of the transmit end is greater than or equal to a quantity of the at least two packets, n is a positive integer, and i is a positive integer less than or equal to n.

Optionally, if the processor system includes the first NC and the second NC, a first port of the first NC has at least two interfaces, and an interface connected to an interface on the first port is located on a second port of the second NC.

Optionally, if a second interface on the first port fails, the transmit end device sends, to the receive end device through a third interface on the first port, the packet added with an identifier related to the second interface.

Figure 7:
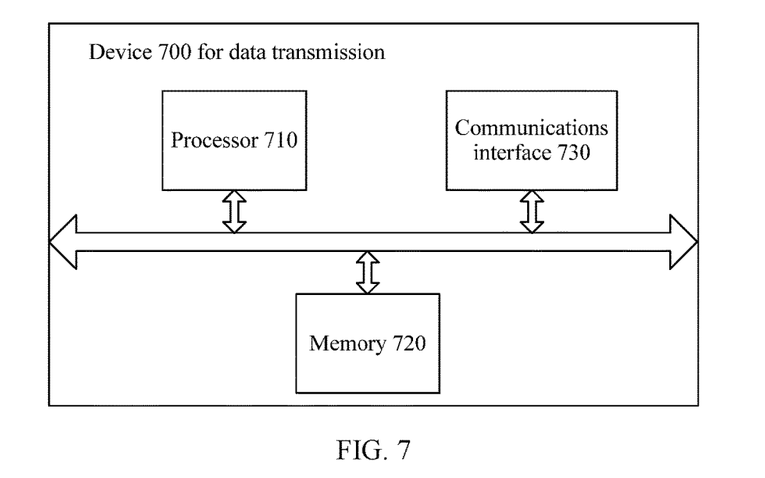
FIG. 7 is a schematic block diagram of a data transmission device according to another embodiment of the present invention.

It should be noted that in this embodiment of the present invention, the sending unit 640 may be implemented by a communications interface, and the obtaining unit 610, the determining unit 620, and the adding unit 630 may be implemented by a processor. As shown in FIG. 7, a device 700 for data transmission may include a processor 710, a memory 720, and a communications interface 730. The processor 710 may be configured to determine information to be sent by the communications interface 730, and the memory 720 may be configured to store code executed by the processor 710. The processor 710, the memory 720, and the communications interface 730 communicate with one another through an internal connection channel, to transmit a control signal and/or a data signal. The memory may be a separate device, or may be integrated into the processor. All or some of the foregoing components may be integrated into a chip for implementation, for example, integrated into a baseband chip for implementation. The following describes the processor 710, the memory 720, and the communications interface 730 in detail.

The memory 720 is configured to store program code.

The processor 710 is configured to execute the program code stored in the memory 720, and when the program code is executed, the processor 710 is configured to obtain at least two to-be-transmitted packets.

The processor 710 is further configured to: determine, in the at least two interfaces of the transmit end device, a first interface used to transmit each of the packets, and determine an identifier that is of each of the packets and that is related to the first interface, where the identifier represents an order of the first interface used to transmit each of the packets in the at least two interfaces used to send the at least two packets.

The processor 710 is further configured to add the identifier to a packet header of each of the packets.

The communications interface 730 is configured to send, to the receive end through the first interface, a packet added with the identifier, so that the receive end device adjusts, based on the identifier, an order of the packet added with the identifier.

It should be understood that units in the device 700 for data transmission are separately configured to perform actions or processing processes performed by the transmit end device in the foregoing methods. To avoid repetition, detailed descriptions thereof are omitted herein.

It should be understood that the foregoing device 700 for data transmission may be a CPU or an NC in a processor system.

This embodiment of the present invention may be applied to a processor, or implemented by a processor. The processor may be an integrated circuit chip and has a signal processing capability. In an implementation process, the steps in the foregoing method embodiments may be implemented by using a hardware integrated logical circuit in the processor, or by using instructions in a form of software. The foregoing processor may be a central processing unit (CPU), and the processor may further be another general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of the present invention. The general purpose processor may be a microprocessor, any conventional processor, or the like. The steps of the method disclosed with reference to the embodiments of the present invention may be directly performed by using a hardware decoding processor, or may be performed by using a combination of hardware and a software unit in the decoding processor. The software unit may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It should be understood that the memory in this embodiment of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memory of the systems and methods described in this specification includes but is not limited to these types of memories and any memory of another proper type.

A network device or a terminal device in an apparatus embodiment fully corresponds to a network device or a terminal device in a method embodiment. A corresponding module performs a corresponding step. For example, a sending module or a transmitter performs a sending step in the method embodiment, and a receiving module or a receiver performs a receiving step in the method embodiment. Steps other than the sending and receiving steps may be performed by a processing module or a processor. For a function of a specific module, refer to a corresponding method embodiment. Details are not described herein again.

In an implementation process, the steps in the foregoing method may be implemented by using a hardware integrated logical circuit in the processor 710, or by using instructions in a form of software. The steps of the method disclosed with reference to the embodiments of the present invention may be directly performed by using a hardware processor, or may be performed by using a combination of hardware and a software module in the processor. The software module may be located in a mature storage medium in the art, such as a random access memory, a flash memory, a read-only memory, a programmable read-only memory, an electrically erasable programmable memory, or a register. The storage medium is located in the memory 720, and the processor 710 reads information in the memory 720 and completes the steps in the foregoing methods in combination with hardware of the processor. To avoid repetition, details are not described herein again.

Figure 8:
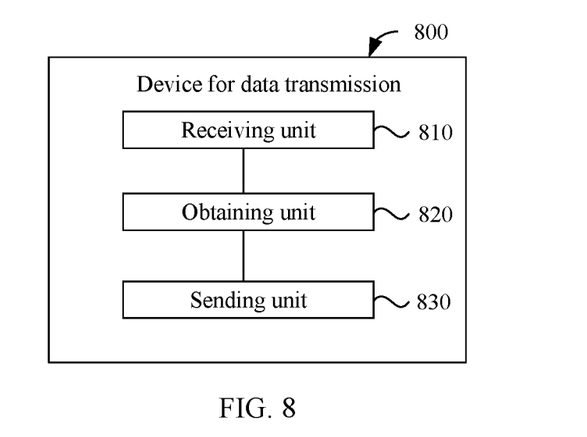
FIG. 8 is a schematic block diagram of a data transmission device according to another embodiment of the present invention.

FIG. 8 is a schematic block diagram of a device 800 for data transmission according to an embodiment of the present invention. The device 800 is a device in a processor system, and the processor system includes a first node controller NC, and further includes a CPU connected to the first NC or a second NC connected to the first NC, where the device is a receive end device, the receive end device is the first NC, the CPU, or the second NC, the receive end device has at least two interfaces, and each interface of the received end device is connected to an interface at a transmit end device. The device 800 includes a receiving unit 810, an obtaining unit 820 and a sending unit 830.

The receiving unit 810 is configured to receive, through a second interface in the at least two interfaces, a packet sent by the transmit end through a first interface, where the second interface is connected to the first interface, the packet includes an identifier related to the first interface, and the identifier represents an order of the first interface in at least two interfaces that are at the transmit end and that are used to send at least two packets.

The obtaining unit 820 is configured to obtain the identifier in the packet.

The sending unit 830 is configured to send the packet to a processing queue of an interface having the identifier at the receive end.

In this embodiment of the present invention, when sending the at least two packets, the transmit end adds an identifier related to an interface at the transmit end to each packet, and then sends a packet added with the identifier between a CPU and an NC that have disordered physical cabling or between NCs with CXPs inserted in a mixed manner, so that the receive end can adjust a sequence of at least two received packets based on the identifier included in the packets. In this way, data can be transmitted between the CPU and the NC that have disordered physical cabling or between the NCs with CXPs inserted in the mixed manner.

Optionally, if the processor system includes the first NC and the CPU, when data is transmitted between the CPU and the first NC in a full bandwidth transmission manner, a quantity of the at least two interfaces of the receive end device is equal to a quantity of the packets, and the identifier that is in each of the packet and that is related to the first interface is an identifier of the first interface.

Optionally, if the processor system includes the first NC and the second NC, a first port of the first NC has at least two interfaces, and an interface that is in the second NC and that is connected to an interface on the first port is located on a second port of the second NC.

Figure 9:
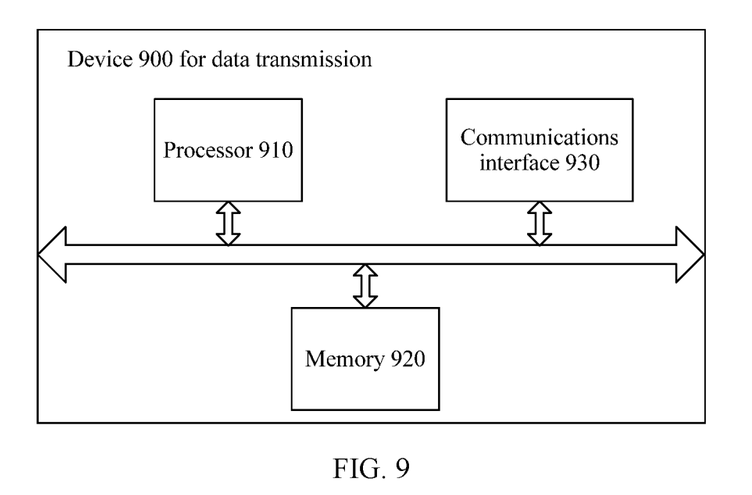
FIG. 9 is a schematic block diagram of a data transmission device according to another embodiment of the present invention.

It should be noted that in this embodiment of the present invention, the receiving unit 810 may be implemented by a communications interface, and the obtaining unit 820 and the sending unit 830 may be implemented by a processor. As shown in FIG. 9, a device 900 for data transmission may include a processor 910, a memory 920, and a communications interface 930. The processor 910 may be configured to determine information received by the communications interface 930, and the memory 920 may be configured to store code executed by the processor 910. The processor 910, the memory 920, and the communications interface 930 communicate with one another through an internal connection channel, to transmit a control signal and/or a data signal. The memory may be a separate device, or may be integrated into the processor. All or some of the foregoing components may be integrated into a chip for implementation, for example, integrated into a baseband chip for implementation. The following describes the processor 910, the memory 920, and the communications interface 930 in detail.

The memory 920 is configured to store program code.

The communications interface 930 is configured to receive, through a second interface in the at least two interfaces, a packet sent by the transmit end through a first interface, where the second interface is connected to the first interface, the packet includes an identifier related to the first interface, and the identifier represents an order of the first interface in at least two interfaces that are at the transmit end and that are used to send at least two packets.

The processor 910 is configured to execute the program code stored in the memory 920, and when the program code is executed, the processor 910 is configured to obtain the identifier of the packet.

The processor 910 is further configured to send the packet to a processing queue of an interface having the identifier at the receive end.

It should be understood that units in the device 900 for data transmission are separately configured to perform actions or processing processes performed by the receive end device in the foregoing methods. To avoid repetition, detailed descriptions thereof are omitted herein.

It should be understood that the foregoing device 900 for data transmission may be a CPU or an NC in a processor system.

This embodiment of the present invention may be applied to a processor, or implemented by a processor. The processor may be an integrated circuit chip and has a signal processing capability. In an implementation process, the steps in the foregoing method embodiments may be implemented by using a hardware integrated logical circuit in the processor, or by using instructions in a form of software. The foregoing processor may be a central processing unit (CPU), and the processor may further be another general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of the present invention. The general purpose processor may be a microprocessor, any conventional processor, or the like. The steps of the method disclosed with reference to the embodiments of the present invention may be directly performed by using a hardware decoding processor, or may be performed by using a combination of hardware and a software unit in the decoding processor. The software unit may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It should be understood that the memory in this embodiment of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memory of the systems and methods described in this specification includes but is not limited to these types of memories and any memory of another proper type.

A network device or a terminal device in an apparatus embodiment fully corresponds to a network device or a terminal device in a method embodiment. A corresponding module performs a corresponding step. For example, a sending module or a transmitter performs a sending step in the method embodiment, and a receiving module or a receiver performs a receiving step in the method embodiment. Steps other than the sending and receiving steps may be performed by a processing module or a processor. For a function of a specific module, refer to a corresponding method embodiment. Details are not described herein again.

In an implementation process, the steps in the foregoing method may be implemented by using a hardware integrated logical circuit in the processor 910, or by using instructions in a form of software. The steps of the method disclosed with reference to the embodiments of the present invention may be directly performed by using a hardware processor, or may be performed by using a combination of hardware and a software module in the processor. The software module may be located in a mature storage medium in the art, such as a random access memory, a flash memory, a read-only memory, a programmable read-only memory, an electrically erasable programmable memory, or a register. The storage medium is located in the memory 920, and the processor 910 reads information in the memory 920 and completes the steps in the foregoing methods in combination with hardware of the processor. To avoid repetition, details are not described herein again.

It should be understood that sequence numbers of the foregoing processes do not mean performing sequences in various embodiments of the present invention. The performing sequences of the processes should be determined based on functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in the present invention, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings, direct couplings or communication connections may be implemented by using some interfaces. Indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions described in the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, a solid state disk (SSD)).

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, wherein the method comprises:

obtaining, by a transmit end, at least two to-be-transmitted packets, wherein the transmit end is coupled to a receive end, with data transmission between the transmit end and the receive end being between a first node controller (NC) and a central processing unit (CPU) or between the first NC and a second NC connected to the first NC;

determining, by the transmit end, a first interface, among interfaces between the transmit end and the receive end, and an identifier, wherein the first interface is used to transmit a first packet and the first packet is one of the at least two to-be-transmitted packets, wherein the identifier indicates an order of the first interface among all the interfaces that send the at least two to-be-transmitted packets;

adding, by the transmit end, the identifier to a packet header of the first packet;

sending, by the transmit end, a packet added with the identifier to the receive end through the first interface;

receiving, by the receive end, the packet added with the identifier; and sending, by the receive end, the packet to a processing queue of an interface having the identifier at the receive end.

2. The method according to claim 1, wherein a first port of the first NC has at least two interfaces, and an interface connected to the at least two interfaces on the first port is located on a second port of the second NC.

3. The method according to claim 2, wherein the method further comprises:

sending, by the transmit end when a second interface on the first port fails, the packet added with the identifier related to the second interface to the receive end through a third interface on the first NC.

4. A data transmission method, comprising:

obtaining, by a transmit end, at least two to-be-transmitted packets, wherein the transmit end is coupled to a receive end, with data transmission between the transmit end and the receive end being between a first node controller (NC) and a central processing unit (CPU) or between the first NC and a second NC connected to the first NC;

determining, by the transmit end, a first interface, among interfaces between the transmit end and the receive end, and an identifier, wherein the first interface is used to transmit a first packet and the first packet is one of the at least two to-be-transmitted packets, wherein the identifier indicates an order of the first interface among all the interfaces that send the at least two to-be-transmitted packets;

adding, by the transmit end, the identifier to a packet header of the first packet; and sending, by the transmit end, a packet added with the identifier to the receive end through the first interface, wherein when data is transmitted between the CPU and the first NC in a full bandwidth transmission manner, a quantity of the interfaces of the transmit end is equal to a quantity of the at least two packets, and the identifier of each of the packets that is related to the first interface is an identifier used for the first interface.

5. A data transmission method, comprising:

obtaining, by a transmit end, at least two to-be-transmitted packets, wherein the transmit end is coupled to a receive end, with data transmission between the transmit end and the receive end being between a first node controller (NC) and a central processing unit (CPU) or between the first NC and a second NC connected to the first NC;

determining, by the transmit end, a first interface, among interfaces between the transmit end and the receive end, and an identifier, wherein the first interface is used to transmit a first packet and the first packet is one of the at least two to-be-transmitted packets, wherein the identifier indicates an order of the first interface among all the interfaces that send the at least two to-be-transmitted packets;

adding, by the transmit end, the identifier to a packet header of the first packet; and sending, by the transmit end, a packet added with the identifier to the receive end through the first interface, wherein when data is transmitted between the CPU and the first NC in a half bandwidth transmission manner, if a quantity of the packets is n and an order of a first interface used to transmit an $i^{th}$ packet in the n packets in n interfaces used to transmit the n packets is i, an identifier that is of the $i^{th}$ packet and that is related to the first interface is an identifier of an $i^{th}$ interface at the transmit end, wherein a quantity of the interfaces of the transmit end is greater than or equal to a quantity of the at least two packets, n is a positive integer, and i is a positive integer less than or equal to n.

6. A transmit device comprising a processor and a memory, the memory is configured to store a computer execution instruction, and when the device runs, the processor executes the computer execution instruction stored in the memory to:

obtain at least two to-be-transmitted packets, wherein the transmit device is coupled to a receive device, with data transmission between the transmit device and the receive device being between a first node controller (NC) and a central processing unit (CPU) or between the first NC and a second NC connected to the first NC;

determine a first interface, among interfaces between the transmit device and the receive device, and an identifier, wherein the first interface is used to transmit a first packet and the first packet is one of the at least two to-be-transmitted packets, wherein the identifier indicates an order of the first interface among all the interfaces that send the at least two to-be-transmitted packets;

add the identifier to a packet header of the first packet;

send a packet added with the identifier to the receive device through the first interface;

receive, by the receive end, the packet added with the identifier; and send, by the receive end, the packet to a processing queue of an interface having the identifier at the receive end.

7. The transmit device according to claim 6, wherein a first port of the first NC has at least two interfaces, and an interface connected to the at least two interfaces on the first port is located on a second port of the second NC.

8. The transmit device according to claim 7, wherein the processor executes the computer execution instruction stored in the memory further to:

when a second interface on the first port fails send the packet added with the identifier related to the second interface to the receive end through a third interface on the first NC.

9. A transmit device comprising a processor and a memory, the memory is configured to store a computer execution instruction, and when the device runs, the processor executes the computer execution instruction stored in the memory to:

obtain at least two to-be-transmitted packets, wherein the transmit device is coupled to a receive device, with data transmission between the transmit device and the receive device being between a first node controller (NC) and a central processing unit (CPU) or between the first NC and a second NC connected to the first NC;

determine a first interface, among interfaces between the transmit device and the receive device, and an identifier, wherein the first interface is used to transmit a first packet and the first packet is one of the at least two to-be-transmitted packets, wherein the identifier indicates an order of the first interface among all the interfaces that send the at least two to-be-transmitted packets;

add the identifier to a packet header of the first packet; and send a packet added with the identifier to the receive device through the first interface, wherein when data is transmitted between the CPU and the first NC in a full bandwidth transmission manner, a quantity of the interfaces of the transmit device is equal to a quantity of the at least two packets, and the identifier of each of the packets and related to the first interface is an identifier used for the first interface.

10. A transmit device comprising a processor and a memory, the memory is configured to store a computer execution instruction, and when the device runs, the processor executes the computer execution instruction stored in the memory to:

obtain at least two to-be-transmitted packets, wherein the transmit device is coupled to a receive device, with data transmission between the transmit device and the receive device being between a first node controller (NC) and a central processing unit (CPU) or between the first NC and a second NC connected to the first NC;

determine a first interface, among interfaces between the transmit device and the receive device, and an identifier, wherein the first interface is used to transmit a first packet and the first packet is one of the at least two to-be-transmitted packets, wherein the identifier indicates an order of the first interface among all the interfaces that send the at least two to-be-transmitted packets;

add the identifier to a packet header of the first packet; and send a packet added with the identifier to the receive device through the first interface, wherein when data is transmitted between the CPU and the first NC in a half bandwidth transmission manner, if a quantity of the packets is n and an order of a first interface used to transmit an $i^{th}$ packet in the n packets in n interfaces used to transmit the n packets is i, an identifier that is of the $i^{th}$ packet and that is related to the first interface is an identifier of an $i^{th}$ interface at the transmit device, wherein a quantity of the interfaces of the transmit device is greater than or equal to a quantity of the at least two packets, n is a positive integer, and i is a positive integer less than or equal to n.

11. A non-transitory computer-readable storage medium comprising instructions which, when executed by a computer, causes the computer to perform a process comprising:

obtaining, by a transmit end, at least two to-be-transmitted packets, wherein the transmit end is coupled to a receive end, with data transmission between the transmit end and the receive end being between a first node controller (NC) and a central processing unit (CPU) or between the first NC and a second NC connected to the first NC;

determining a first interface, among interfaces between the transmit end and the receive end, and an identifier, wherein the first interface is used to transmit a first packet and the first packet is one of the at least two to-be-transmitted packets, wherein the identifier indicates an order of the first interface among all the interfaces that send the at least two to-be-transmitted packets;

adding the identifier to a packet header of the first packet;

sending a packet added with the identifier to the receive end through the first interface;

receiving, by the receive end, the packet added with the identifier; and sending, by the receive end, the packet to a processing queue of an interface having the identifier at the receive end.

* * * * *